March 16, 1954     C. D. SHELBURNE     2,672,301
SPINNER-TYPE FISHING REEL
Filed May 9, 1951
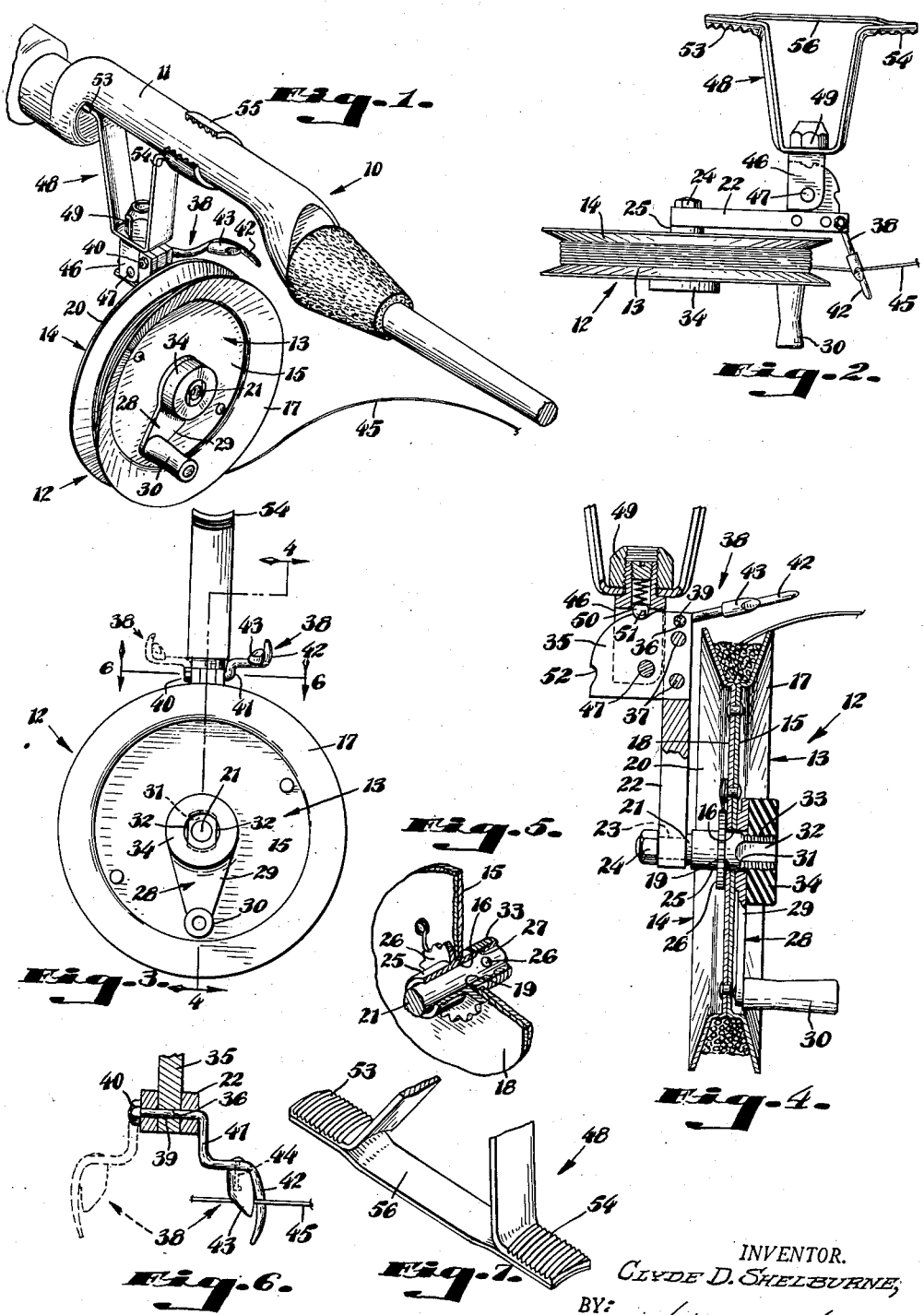
INVENTOR.
CLYDE D. SHELBURNE,
BY: Harold B. Hood.
ATTORNEY.

Patented Mar. 16, 1954

2,672,301

UNITED STATES PATENT OFFICE 2,672,301

SPINNER-TYPE FISHING REEL

Clyde D. Shelburne, Shelburn, Ind.

Application May 9, 1951, Serial No. 225,371

4 Claims. (Cl. 242—84.5)

This invention relates to a line winding and storing device primarily adaptable for use with a "spinner-type" fishing reel.

The primary object of my invention is to provide a relatively simple and inexpensive means of rotating the receiving spool for the reception of the line thereon; and further for the provision of a novel form of guide finger for picking up the line and laying it neatly upon the rotating spool.

A further object of this invention is to provide an improved means of removing the linear twist from the line resulting from its being drawn axially from the storing spool—and this by the relatively simple expedient of gripping the line between a guide finger and a rubber pad carried thereon.

A still further object is to provide means of reversing the position of the guide finger to allow for rotation of the storing spool in either a right or left hand direction, depending upon the user of the device.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view showing the preferred embodiment of my invention in position for axial withdrawal of the line from the storing spool;

Fig. 2 is a side elevation of the device of Fig. 1 showing the spool in position for winding of the line upon the spool;

Fig. 3 is a front elevation showing the reversible feature of my invention;

Fig. 4 is a longitudinal sectional view showing several details of construction of my invention and taken substantially on line 4, 4 of Fig. 3, looking in the direction of the arrows;

Fig. 5 is a perspective sectional view of a detail of my invention;

Fig. 6 is a further sectional view of a detail thereof, taken substantially on line 6, 6 of Fig. 3, looking in the direction of the arrows; and Fig. 7 is a partial perspective view of the means for mounting the reel to the rod.

Referring more particularly to the drawings and especially to Fig. 1, I have shown a fishing rod, referred to generally by reference numeral 10, having a portion 11 thereof for the reception thereon of a standard supporting a line winding and storing spool referred to generally by reference numeral 12.

Spool 12 comprises a pair of substantially circular, sheet-metal, cup-shaped elements 13 and 14. Element 13 comprises a substantially flat disc portion 15, centrally perforated as at 16 and terminating at its periphery in an annular rim 17, offset from the plane of disc 15.

Element 14, allochirally related to element 13, comprises a similar central disc portion 18, centrally perforated as at 19, and terminating at its periphery in an annular rim 20. Element 13 is riveted or otherwise secured to element 14 with the respective faces of discs 15 and 18 in mating relation and with central perforations 16 and 19 in alignment.

A shaft 21 is non-rotationally carried on a standard 22, as by means of passing a reduced end 23 of said shaft through a perforation in said standard and securing it there by means of a nut 24, or the like.

A sleeve 25, having a radially projecting flange 26 is mounted for rotation on shaft 21 as by means of a spring biased ball 26' in shaft 21 and a co-operating internal groove 27 in sleeve 25 (see Fig. 5). Spool 12 is journalled upon sleeve 25 through central perforations 16 and 19.

For rotation of spool 12, I have provided a crank, referred to generally by reference numeral 28, having a leg 29 and a manipulating knob 30. Leg 29, on the end opposite from knob 30, is provided with a perforation 31 to be received thereby upon the sleeve 25. Said leg 29 is keyed to said sleeve by means of flats 32, 32 on sleeve 25 and the forming of perforation 31 to conform to the shape of sleeve 25 and flats 32, 32.

The end 33 of sleeve 25 is threaded and a nut 34 is threadedly received thereon and turned up tightly against the leg 29, thereby clamping spool 12 frictionally between leg 29 and flange 26. Thus, it will be seen that a driving connection is established between manipulating knob 30 and spool 12 which can be varied to slip, at a predetermined load, by means of the pressure applied by nut 34.

Standard 22 extends radially beyond the periphery of spool 12 and is bifurcated to receive a block 35. A bore 36, substantially at right angles to shaft 21, passes through the standard 22 and block 35. Said block is held securely to standard 22 by means of rivets 37 or the like.

A guide finger, referred to generally by reference numeral 38, has a shank 39 passing through bore 36, and is threaded at one end for the reception thereon of nut 40. Said finger has an intermediate portion 41 bent at substantially right angles to shank 39; and standard 22 is gripped tightly between nut 40 and portion 41.

A toe 42 on finger 38 is offset from the portion 41 thereof and overlies the periphery of spool 12, substantially parallel to portion 41. A rubber pad 43 is secured to finger 38 by a rivet 44 or the like, and snugly engages toe 42 on the side thereof adjacent spool 12, having a terminal portion near the median plane of said spool spaced from said toe.

In casting, the reel is in the position as illustrated in Fig. 1. The line is axially stripped from spool 12 and in so doing is linearly twisted as each loop of line is withdrawn.

In rewinding the line, the reel is placed in the position as shown in Fig. 2. Line 45 is picked up by toe 42 and is guided thereby to lie neatly on spool 12 between flanges 17 and 20. The line finds its way between toe 42 and the pad 43; and the gripping action of the pad tends to remove the linear twists from the line as it is drawn between the toe and pad.

To enable the reel to be placed in the position shown in Fig. 2 (which is 90° removed from the position of Fig. 1), I provide a yoke 46, pivoted to block 35 by means of axle 47. Yoke 46 has a hub 48 passing through and secured to the base of a pedestal 48 by means of nut 49. A spring-biased ball 50 is carried in said hub and takes into notches 51 and 52 in block 35 to hold the reel alternatively in either of the positions shown in Figs. 1 and 2.

As indicated in dotted lines in Figs. 3 and 6, the position of finger 38 may be reversed so as to allow for guiding line 45 upon spool 12 when said spool is rotated in a counter-clockwise direction as viewed in Fig. 3. Thus, by this relatively simple expedient, the reel is made easily adaptable for use by either a right- or left-handed person.

One of the chief difficulties of most reels in use today is the absence of a positive means for securing the reel to the rod. The most common means for accomplishing this is to provide a pair of oppositely-facing toes generally similar to the toes 53 and 54 shown in Figs. 2 and 7, said toes being carried on legs of a reel-supporting pedestal 48. The toes are received respectively in a socket in rod 10 and a ferrule 55 on rod 10 is slid over the remaining toe. This arrangement is quite satisfactory at the outset, but as the parts become worn with the stress and strain placed upon them by use, the ferrule will slip off the toe and allow the reel to become separated from the rod. To alleviate this difficulty, fishermen resort to many devices, such as taping the parts together to prevent their accidental dislodgment.

To correct this difficulty completely, I have provided the ferrule 55 with internal threads and have grooved the toes 53 and 54 to cooperate with said threads, as shown in Fig. 7. The grooves for each toe are uniformly spaced longitudinally thereof and extend generally transversely of the toe, being uniformly inclined at a common lead angle from the longitudinal axis of the toe to conform to the internal threading of the ferrule 55. A spring leaf 56 is secured to toes 53 and 54 to straddle the legs of pedestal 48. The mid-portion of said spring is offset slightly from the plane of the toes so that when the toe 53 is inserted into the socket in rod 10, toe 54 must be, of necessity, pulled down against rod portion 11, thereby straightening spring leaf 56, before ferrule 55 can be screwed onto toe 54. Thus spring 56 exerts a constant pressure outwardly, from rod portion 11, on the toes and prevents, thereby, the ferrule 55 from becoming accidentally unscrewed from toe 54.

I prefer to groove both toes 53 and 54 to make the reel universally adaptable to differently arranged rods.

I claim as my invention:

1. In a line winding and storing device, a non-rotating shaft, a sleeve journalled thereon having a threaded end portion and a radially-projecting flange inboard from said end portion, a line-receiving spool, having oppositely disposed end faces centrally perforated and mounted on said sleeve for rotation about the axis of said shaft, a crank, one leg thereof keyed on said end portion against one of the faces of said spool, a nut screwed onto said threaded end, against said crank leg, clamping said spool faces frictionally between said flange and said crank leg, a standard, means fixedly supporting said shaft upon said standard to project in one direction therefrom, a block fixedly secured to said standard in a region remote from said shaft and projecting therefrom in the opposite direction, a finger supported from said standard beyond the periphery of said spool in the region of said block and having a toe overlying the periphery of said spool to intersect the median plane thereof, said toe being offset from said finger outwardly from said spool, and a rubber pad secured to said finger, near the junction of said toe and said finger, said pad snugly engaging said toe on the side thereof adjacent said spool and having a terminal portion near the median plane of said spool slightly spaced from said toe for the reception of a line between said toe and said pad.

2. In a line winding and storing device having a spool for the reception of the line thereon, guide means for removing the linear twist from said line comprising a finger having a toe overlying the periphery of said spool, and a resiliently compressible pad secured to said finger snugly engaging said toe on the side thereof adjacent said spool and having a terminal portion near the median plane of said spool slightly spaced from said toe, for the reception of a line between said toe and said pad.

3. In a line winding and storing device having a spool for the reception of line thereon, a standard providing a journal mounting for said spool for rotation about its own axis, said standard being provided with a hole therethrough on an axis in a plane perpendicular to said spool axis, a pick-up finger reversibly supported on said standard for guiding such line during rotation of said spool, said finger comprising a shank oscillably mounted in said hole, said shank having a threaded end projecting in one direction from said hole, a portion of said finger at the opposite side of said standard being turned substantially at right angles to said shank, a nut threaded on said threaded shank end, said nut and said finger portion bearing on opposite faces of said standard to hold said shank against oscillation from a selected position of adjustment, said finger including a second portion merging with said first-named portion and substantially parallel with said shank and projecting toward the periphery of said spool, and a toe substantially parallel with said first-named portion, overlying said spool periphery and intersecting the median plane of said spool.

4. The device of claim 3 including a rubber pad secured to said second portion and said toe, near the junction thereof, snugly engaging that surface of said toe facing said spool and terminating near the median plane of said spool.

CLYDE D. SHELBURNE.

References Cited in the file of this patent

UNITED STATES PATENTS

| Number | Name | Date |
|---|---|---|
| 822,113 | Glocker | May 29, 1906 |
| 1,281,261 | Andreas | Oct. 15, 1918 |
| 1,825,866 | Hieser et al. | Oct. 6, 1931 |
| 2,327,469 | Teitsma | Aug. 24, 1943 |
| 2,400,007 | Kiest | May 7, 1946 |
| 2,409,940 | Kay | Oct. 22, 1946 |
| 2,546,559 | Nix | Mar. 27, 1951 |

FOREIGN PATENTS

| Number | Country | Date |
|---|---|---|
| 183,277 | Great Britain | July 27, 1922 |